United States Patent
Cariello

(10) Patent No.: US 11,281,400 B2
(45) Date of Patent: Mar. 22, 2022

(54) TEMPERATURE-BASED STORAGE SYSTEM ORGANIZATION

(71) Applicant: Micron Technology, Inc., Boise, ID (US)

(72) Inventor: Giuseppe Cariello, Boise, ID (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 16/385,830

(22) Filed: Apr. 16, 2019

(65) Prior Publication Data

US 2020/0333976 A1 Oct. 22, 2020

(51) Int. Cl.
*G06F 3/06* (2006.01)
*G01K 3/00* (2006.01)
*G01K 1/022* (2021.01)

(52) U.S. Cl.
CPC ........... *G06F 3/0659* (2013.01); *G01K 1/022* (2013.01); *G01K 3/00* (2013.01); *G06F 3/0604* (2013.01); *G06F 3/0653* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 2012/0134213 A1* | 5/2012 | Choi | G11C 16/30 365/185.18 |
| 2016/0117216 A1 | 4/2016 | Muchherla et al. | |
| 2017/0004032 A1* | 1/2017 | Chinnakkonda Vidyapoornachary | G06F 3/0619 |
| 2017/0255403 A1* | 9/2017 | Sharon | G11C 11/5642 |
| 2017/0262198 A1* | 9/2017 | Nakata | G06F 3/0634 |
| 2018/0046402 A1* | 2/2018 | Vogan | G11C 7/04 |
| 2018/0061504 A1* | 3/2018 | Kim | G11C 7/04 |
| 2018/0189135 A1* | 7/2018 | Naik | G11C 16/26 |
| 2018/0356997 A1 | 12/2018 | Gorobets et al. | |
| 2019/0043596 A1* | 2/2019 | Madraswala | G11C 16/26 |
| 2019/0188589 A1* | 6/2019 | Ponnuru | G11C 5/04 |
| 2019/0189239 A1* | 6/2019 | Suzuki | G06F 11/1068 |
| 2019/0369685 A1* | 12/2019 | Chang | G11C 16/3495 |
| 2019/0392907 A1* | 12/2019 | Her | G11C 16/0483 |
| 2020/0073592 A1* | 3/2020 | Nishikawa | G06F 3/0683 |
| 2020/0089426 A1* | 3/2020 | Shirota | G06F 3/064 |

(Continued)

OTHER PUBLICATIONS

Choudhuri, Siddarth, "Performance Improvement of Block Based NAND Flash Translation Layer", Codes ISSS 07, (2007), 6 pgs.

*Primary Examiner* — Edward J Dudek, Jr.
*Assistant Examiner* — Ralph A Verderamo, III
(74) *Attorney, Agent, or Firm* — Schwegman Lundberg & Woessner, P.A.

(57) ABSTRACT

Systems, apparatus, and methods are disclosed comprising receiving temperature information corresponding to a write temperature of at least one of multiple pages of non-volatile memory cells of a group of non-volatile memory cells, determining a statistical measure of temperature information for the group non-volatile memory cells using the received temperature information, and storing the determined statistical measure of temperature information for the group of non-volatile memory cells. The stored determined statistical measure of temperature information can be used to optimize or improve one or more storage system operations.

23 Claims, 6 Drawing Sheets

(56) References Cited

U.S. PATENT DOCUMENTS

2020/0105349 A1\* 4/2020 Kang ..................... G11C 16/26
2020/0264792 A1\* 8/2020 Paley .................... G06F 3/0679

\* cited by examiner

TEMPERATURE-BASED STORAGE SYSTEM ORGANIZATION

BACKGROUND

Memory devices are semiconductor circuits that provide electronic storage of data for a host system (e.g., a computer or other electronic device). Memory devices may be volatile or non-volatile. Volatile memory requires power to maintain data, and includes devices such as random-access memory (RAM), static random-access memory (SRAM), dynamic random-access memory (DRAM), or synchronous dynamic random-access memory (SDRAM), among others. Non-volatile memory can retain stored data when not powered, and includes devices such as flash memory, read-only memory (ROM), electrically erasable programmable ROM (EEPROM), erasable programmable ROM (EPROM), resistance variable memory, such as phase change random access memory (PCRAM), resistive random-access memory (RRAM), or magnetoresistive random access memory (MRAM), among others.

Host systems typically include a host processor, a first amount of main memory (e.g., often volatile memory, such as DRAM) to support the host processor, and one or more storage systems (e.g., often non-volatile memory, such as flash memory) that provide additional storage to retain data in addition to or separate from the main memory.

A storage system, such as a solid-state drive (SSD), can include a memory controller and one or more memory devices, including a number of (e.g., multiple) dies or logical units (LUNs). In certain examples, each die can include a number of memory arrays and peripheral circuitry thereon, such as die logic or a die processor. The memory controller can include interface circuitry configured to communicate with a host device (e.g., the host processor or interface circuitry) through a communication interface (e.g., a bidirectional parallel or serial communication interface). The memory controller can receive commands or operations from the host system in association with memory operations or instructions, such as read or write operations to transfer data (e.g., user data and associated integrity data, such as error data or address data, etc.) between the memory devices and the host device, erase operations to erase data from the memory devices, perform drive management operations (e.g., data migration, garbage collection, block retirement), etc.

Software (e.g., programs), instructions, operating systems (OS), and other data are typically stored on storage systems and accessed by main memory for use by the host processor. Main memory (e.g., RAM) is typically faster, more expensive, and a different type of memory device (e.g., volatile) than a majority of the memory devices of the storage system (e.g., non-volatile, such as an SSD, etc.). In addition to the main memory, host systems can include different levels of volatile memory, such as a group of static memory (e.g., a cache, often SRAM), often faster than the main memory, in certain examples, configured to operate at speeds close to or exceeding the speed of the host processor, but with lower density and higher cost.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
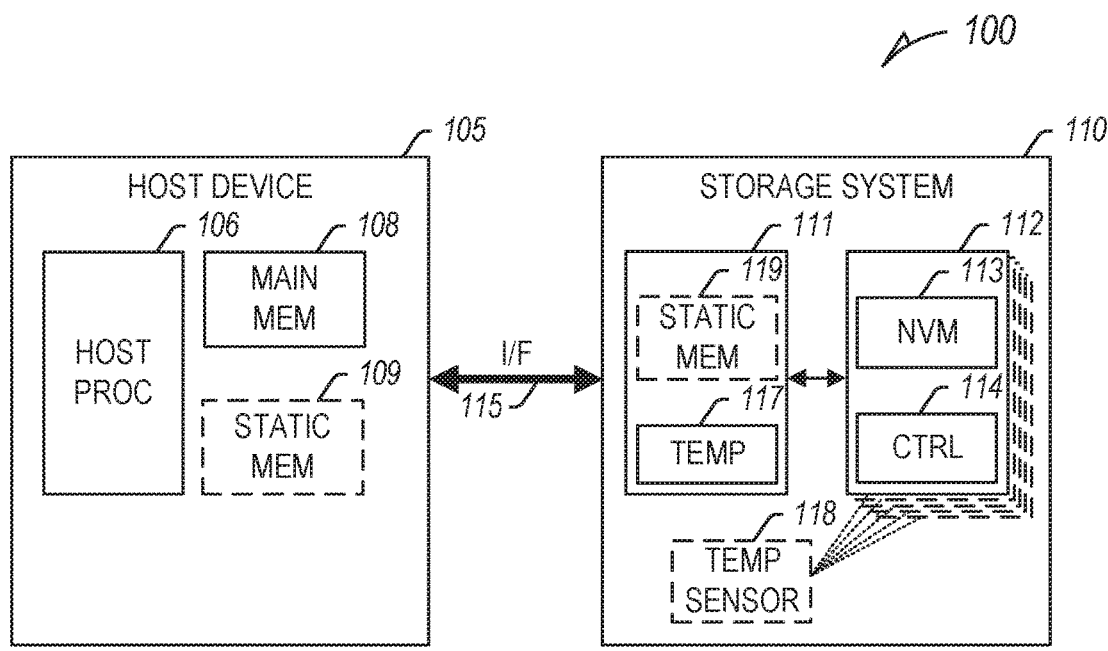
FIG. 1 illustrates an example host system including a host device and a storage system.

Data errors arise when data stored in memory devices falls outside expected distributions. Error-correcting code (ECC) can be implemented by one or more system components, such as a memory controller, a device controller, a host processor, or other controller or circuit, to correct such data errors.

When write and read temperature for a memory cell of a memory device significantly differ, read levels may not be centered in distribution valleys on the memory cell, often leading to a failed read operation (e.g., an uncorrectable ECC (UECC), etc.) and further read recovery operations. For example, write temperature, such as a temperature of a memory device, can be recorded during a program operation of the memory device. In other examples, a write temperature can include a temperature proximate a group of memory cells during a program operation of such memory cells. When an error is detected, the memory device (e.g., firmware (FW) in the memory device) can retrieve the recorded write temperature and adjust one or more read levels or recovery operations, such as using information from one or more look-up tables associated with such write temperature, for example, in contrast to the current read temperature, etc. However, such recovery flow is only available after the first read operation. In certain examples, the temperature information may itself not be readable or recoverable, as such meta data is affected by the same problem affecting data in the failed read operation. In contrast, saving full temperature information, such as using a system table, is expensive, both in space and overhead required for loading, saving, and folding, etc., as temperature information further impacts garbage collection and memory device maintenance outside of read operations, and thus, sustained write performance.

The present inventor has recognized, among other things, systems, methods, and apparatus to manage temperature information in a storage system including a memory controller and one or more memory devices. For example, in real usage cases and many test environments, extreme and sudden variations of temperature are unlikely to occur. As discussed further below, storing of monitored temperature data may be implemented, though such can be space intensive, and in some cases and may require more time to access than would be preferable. As described herein, in many example systems, memory operation can be effectively managed in reference to metrics regarding the monitored temperature data, in place of the temperature data itself (e.g., individual temperature measurements for each memory operation).

Accordingly, tracking statistical measures of temperature information (e.g., one or more determined metrics, including one or more of a maximum, minimum, mean, variance, standard deviation, coefficient of variation, distribution, etc., in certain examples, distinct from the individual temperature measurements themselves), across a group of memory cells, such as at a block, a super block, or a window level, may provide adequate temperature compensation mechanisms across the group, such that a storage system can determine memory operation parameters according to the statistical measures of temperature information (e.g., ranges of the statistical measures, etc.). As discussed herein, 'temperature' refers to a measure of heat, and not to the frequency of usage of such information (e.g., 'hot' or 'cold'—in the context of read or write frequency).

In an example, multiple zones (e.g., sub-groups of memory cells, or one or more groups of memory cells from a block, a super block, a window, a plane, a memory devices, etc.) can be determined based on temperature uniformity, such that operations in a specific zone or range of zones can be performed with a high degree of uniformity, such that a single (or small number) of temperature compensations can apply across groups of memory cells within the zone, in certain examples, avoiding (or reducing) individual temperature compensation within the zone.

The storage system can include a temperature sensor, or multiple temperature sensors associated with different zones (or portions thereof) of the memory controller or the one or more memory devices. Data from the one or more temperature sensors can be recorded in one or more locations, such as accessible by the memory controller. The memory controller, or one or more device controllers or controller circuitry of the one or more memory devices, can apply thermal management control on a device basis or sub-device basis (planes, superblocks, etc.). Temperature information can be stored itself, such as in a table, and can be analyzed by a controller to generate one or more statistical measures of the temperature information, which may then be stored in a readily available location for use in controlling device (or sub-device) operation, as described herein.

For example, a group of memory cells having a uniform range of temperature information (e.g., within the same range, or having a variance within a threshold, etc.) can be assigned or grouped to have a preselected or specific read process (e.g., using one or more specific read thresholds, etc.). When in urgent need of a free block, the storage system (e.g., FW of the memory device) can select source blocks for a folding operation based on a lower valid block count, lower temperature variance, or combinations thereof. In an example, the storage system can avoid folding blocks or performing other memory device or storage system maintenance when the current operating temperature differs from the write temperature (e.g., an opposing temperature range, etc.), or can select blocks with a matching or closer write temperature (to the current temperature, etc.). If temperature can be visualized on a horizontal line, opposing temperatures or temperature ranges can be separated by a horizontal difference above a threshold, or having a number of intervening ranges, etc. The storage system (e.g., the memory controller or one or more device controllers or controller circuitry of the one or more memory devices) can perform maintenance on groups of memory cells having greater temperature information variance during idle time, or other times or periods that do not adversely impact system performance or user experience.

In an example, the storage system (e.g., FW of the storage system) can collect, determine, and store the statistical measures of temperature information in memory (e.g., static random-access memory (SRAM), etc.) for each group of memory cells (e.g., a block, a super block, a super page, etc.), such as in a table (e.g., similar to a physical-to-logical (P2L) table, etc.). If the temperature information is uniform across a particular zone or group of memory cells, data for the zone can be consolidated into one or more measures and the table can be omitted, saving space, time, and system resources. In certain examples, the defined zones (groups of memory cells) can be dynamic, changing to accommodate variance across a device. To improve performance, the stored statistical measures of temperature information (e.g., the table, etc.) can be loaded, for example, prior to memory device or storage system maintenance (e.g., a fold operation, etc.), or during normal read operations. The stored statistical measures can be loaded and, in combination with current temperature information, used to determine one or more parameters for data operations (e.g., read operations, write operations, fold operations, etc.).

Even when detailed statistical measures of temperature information are not stored in the memory device or storage system, such as when design overprovisioning considerations disallow such storage, the statistical measures of temperature information (e.g., a table) can be dynamically created during a memory operation, such as fold operation, during an extended read operation (e.g., detected sequential read operations or patterns), etc.

Some storage systems process blocks, in a garbage collection process, in logical order, such as first through valid blocks stored in L2P tables in static memory. At worst case, such order is not sequential and comprises random reads spread throughout the block. Temperature information can be measured and recorded in metadata (or flags) of the stored data. The storage system (e.g., FW of the storage system) can retrieve the recorded temperature information at each read and store it in a dedicated data structure, such as in static memory, etc. When landing again on an already-touched super page, previously retrieved temperature information can be utilized to determine a parameter for the read operation (e.g., adjust one or more read thresholds based on the retrieved temperature information and the current temperature information, etc.). When landing on a fresh page-line, the storage system can try and predict write temperature information by interpolating values from nearest known points. In certain examples, such interpolation can be especially effective for qualification testing where preconditioning can be performed during controlled temperature ramps, etc. Further, the storage system can track failed predictions, and can stop predicting after a threshold number of failed predictions (e.g., read failures using the predicted write temperature information, etc.).

FIG. 1 illustrates an example system (e.g., a host system) 100 including a host device 105 and a storage system 110 configured to communicate over a communication interface (I/F) 115 (e.g., a bidirectional parallel or serial communication interface). In an example, the communication interface 115 can be referred to as a host interface. The host device 105 can include a host processor 106 (e.g., a host central processing unit (CPU) or other processor or processing device) or other host circuitry (e.g., a memory management unit (MMU), interface circuitry, etc.). In certain examples, the host device 105 can include a main memory (MAIN MEM) 108 (e.g., DRAM, etc.) and optionally, a static memory (STATIC MEM) 109, to support operation of the host processor (HOST PROC) 106.

The storage system 110 can include a universal flash storage (UFS) device, an embedded MMC (eMMC™)

device, or one or more other memory devices. For example, if the storage system 110 includes a UFS device, the communication interface 115 can include a serial bidirectional interface, such as defined in one or more Joint Electron Device Engineering Council (JEDEC) standards (e.g., JEDEC standard D223D (JESD223D), commonly referred to as JEDEC UFS Host Controller Interface (UFSHCI) 3.0, etc.). In another example, if the storage system 110 includes an eMMC device, the communication interface 115 can include a number of parallel bidirectional data lines (e.g., DAT[7:0]) and one or more command lines, such as defined in one or more JEDEC standards (e.g., JEDEC standard D84-B51 (JESD84-A51), commonly referred to as JEDEC eMMC standard 5.1, etc.). In other examples, the storage system 110 can include one or more other memory devices, or the communication interface 115 can include one or more other interfaces, depending on the host device 105 and the storage system 110.

The storage system 110 can include a memory controller (MEM CTRL) 111 and a non-volatile memory device 112. The memory controller 111 can optionally include a limited amount of static memory 119 to support operations of the memory controller 111. In an example, the non-volatile memory device 112 can include a number of non-volatile memory devices (e.g., dies or LUNs), such as one or more stacked flash memory devices (e.g., as illustrated with the stacked dashes underneath the non-volatile memory device 112), etc., each including non-volatile memory (NVM) 113 (e.g., one or more groups of non-volatile memory cells) and a device controller (CTRL) 114 or other periphery circuitry thereon (e.g., device logic, etc.), and controlled by the memory controller 111 over an internal storage-system communication interface (e.g., an Open NAND Flash Interface (ONFI) bus, etc.) separate from the communication interface 115.

Flash memory devices typically include one or more groups of one-transistor, floating gate (FG) or replacement gate (RG) memory cells. Two common types of flash memory array architectures include NAND and NOR architectures. The memory cells of the memory array are typically arranged in a matrix. The gates of each memory cell in a row of the array are coupled to an access line (e.g., a word line). In NOR architecture, the drains of each memory cell in a column of the array are coupled to a data line (e.g., a bit line). In NAND architecture, the drains of each memory cell in a column of the array are coupled together in series, source to drain, between a source line and a bit line.

Each memory cell in a NOR, NAND, 3D Cross Point, HRAM, MRAM, or one or more other architecture semiconductor memory array can be programmed individually or collectively to one or a number of programmed states. A single-level cell (SLC) can represent one bit of data per cell in one of two programmed states (e.g., 1 or 0). A multi-level cell (MLC) can represent two or more bits of data per cell in a number of programmed states (e.g., $2^n$, where n is the number of bits of data). In certain examples, MLC can refer to a memory cell that can store two bits of data in one of 4 programmed states. A triple-level cell (TLC) can represent three bits of data per cell in one of 8 programmed states. A quad-level cell (QLC) can represent four bits of data per cell in one of 16 programmed states. In other examples, MLC can refer to any memory cell that can store more than one bit of data per cell, including TLC and QLC, etc.

The storage system 110 can include a multimedia card (MMC) solid-state storage device (e.g., micro secure digital (SD) cards, etc.). MMC devices include a number of parallel interfaces (e.g., an 8-bit parallel interface) with a host device 105, and are often removable and separate components from the host device. In contrast, embedded MMC (eMMC) devices are attached to a circuit board and considered a component of the host device, with read speeds that rival serial ATA (SATA) based SSD devices. As demand for mobile device performance continues to increase, such as to fully enable virtual or augmented-reality devices, utilize increasing networks speeds, etc., storage systems have shifted from parallel to serial communication interfaces between the storage system and a host device. UFS devices, including controllers and firmware, communicate with a host device using a low-voltage differential signaling (LVDS) serial interface with dedicated read/write paths, further advancing read/write speeds between a host device and a storage system.

In three-dimensional (3D) architecture semiconductor memory device technology, vertical floating gate (FG) or replacement gate (RG) (or charge trapping) storage structures can be stacked, increasing the number of tiers, physical pages, and accordingly, the density of memory cells in a memory device. Data is often stored arbitrarily on the storage system as small units. Even if accessed as a single unit, data can be received in small, random 4-16 k single file reads (e.g., 60%-80% of operations are smaller than 16 k). It is difficult for a user and even kernel applications to indicate that data should be stored as one sequential cohesive unit. File systems are typically designed to optimize space usage, and not sequential retrieval space.

The memory controller 111 can receive instructions from the host device 105, and can communicate with the non-volatile memory device 112, such as to transfer data to (e.g., write or erase) or from (e.g., read) one or more of the memory cells of the non-volatile memory device 112. The memory controller 111 can include, among other things, circuitry or firmware, such as a number of components or integrated circuits. For example, the memory controller 111 can include one or more memory control units, circuits, or components configured to control access across the memory array and to provide a translation layer between the host device 105 and the storage system 100, such as a memory manager, one or more memory management tables, etc.

The memory manager can include, among other things, circuitry or firmware, such as a number of components or integrated circuits associated with various memory management functions, including, among other functions, wear leveling (e.g., garbage collection or reclamation), error detection or correction, block retirement, or one or more other memory management functions. The memory manager 125 can parse or format host commands (e.g., commands received from the host device 105) into device commands (e.g., commands associated with operation of a memory array, etc.), or generate device commands (e.g., to accomplish various memory management functions) for the device controller 114 or one or more other components of the storage system 110.

The memory manager can include a set of management tables configured to maintain various information associated with one or more component of the storage system 110 (e.g., various information associated with a memory array or one or more memory cells coupled to the memory controller 111). For example, the management tables can include information regarding block age, block erase count, error history, or one or more error counts (e.g., a write operation error count, a read bit error count, a read operation error count, an erase error count, etc.) for one or more blocks of memory cells coupled to the memory controller 111. In certain examples, if the number of detected errors for one or more of the error counts is above a threshold, the bit error can be referred to as an uncorrectable bit error. The management tables can maintain a count of correctable or uncorrectable bit errors, among other things. In an example, the management tables can include translation tables or a L2P mapping.

The memory manager can implement and use data structures to reduce storage system 110 latency in operations that involve searching L2P tables for valid pages, such as garbage collection. To this end, the memory manager is arranged to maintain a data structure (e.g., table region data structure, tracking data structure, etc.) for a physical block. The data structure includes indications of L2P mapping table regions, of the L2P table. In certain examples, the data structure is a bitmap (e.g., a binary array). In an example, the bitmap includes a bit for each region of multiple, mutually exclusive, regions that span the L2P table.

The non-volatile memory device 112 or the non-volatile memory 113 (e.g., one or more 3D NAND architecture semiconductor memory arrays) can include a number of memory cells arranged in, for example, a number of devices, planes, blocks, physical pages, super blocks, or super pages. As one example, a TLC memory device can include 18,592 bytes (B) of data per page, 1536 pages per block, 548 blocks per plane, and 4 planes per device. As another example, an MLC memory device can include 18,592 bytes (B) of data per page, 1024 pages per block, 548 blocks per plane, and 4 planes per device, but with half the required write time and twice the program/erase (P/E) cycles as a corresponding TLC memory device. Other examples can include other numbers or arrangements. A super block can include a combination of multiple blocks, such as from different planes, etc., and a window can refer to a stripe of a super block, typically matching a portion covered by a physical-to-logical (P2L) table chunk, etc., and a super page can include a combination of multiple pages.

The term "super" can refer to a combination or multiples of a thing or things. For examples, a super block can include a combination of blocks. If a memory device includes 4 planes, a super block may refer to the same block on each plane, or a pattern of blocks across the panes (e.g., a combination of block 0 on plane 0, block 1 on plane 1, block 2 on plane 2, and block 3 on plane 3, etc.). In an example, if a storage system includes multiple memory devices, the combination or pattern of blocks can extend across the multiple memory devices. The term "stripe" can refer to a pattern of combination or pattern of a piece or pieces of a thing or things. For example, a stripe of a super block can refer to a combination or pattern of pages from each block in the super block.

In operation, data is typically written to or read from the storage system 110 in pages and erased in blocks. However, one or more memory operations (e.g., read, write, erase, etc.) can be performed on larger or smaller groups of memory cells, as desired. For example, a partial update of tagged data from an offload unit can be collected during data migration or garbage collection to ensure it was re-written efficiently. The data transfer size of a memory device is typically referred to as a page, whereas the data transfer size of a host device is typically referred to as a sector. Although a page of data can include a number of bytes of user data (e.g., a data payload including a number of sectors of data) and its corresponding metadata, the size of the page often refers only to the number of bytes used to store the user data. As an example, a page of data having a page size of 4 KB may include 4 KB of user data (e.g., 8 sectors assuming a sector size of 512B) as well as a number of bytes (e.g., 32B, 54B, 224B, etc.) of auxiliary or metadata corresponding to the user data, such as integrity data (e.g., error detecting or correcting code data), address data (e.g., logical address data, etc.), or other metadata associated with the user data.

Different types of memory cells or memory arrays can provide for different page sizes, or may require different amounts of metadata associated therewith. For example, different memory device types may have different bit error rates, which can lead to different amounts of metadata necessary to ensure integrity of the page of data (e.g., a memory device with a higher bit error rate may require more bytes of error correction code (ECC) data than a memory device with a lower bit error rate). As an example, an MLC NAND flash device may have a higher bit error rate than a corresponding SLC NAND flash device. As such, the MLC device may require more metadata bytes for error data than the corresponding SLC device.

In an example, the data in a chunk or data unit can be handled in a specific manner throughout its tenure on the storage system. For example, the data is managed as one unit during data migration (e.g., garbage collection, etc.) such that the efficient read/write properties are preserved as data is moved to its new physical location on the storage system. In certain examples, the only limit to the number of chunks, data units, or blocks configurable for storage, tagging, etc., are the capacities of the system.

In an example, one or more of the host device 105 or the storage system 110 can include a temperature sensor 118 (or one or more temperature sensors) configured to sense temperature information of one or more of the host device 105, the storage system 110, or the environment in which the host device 105 or the storage system 110 is operating. In an example, the host device 105 can be configured to provide data to the storage system 110 including user and auxiliary data. In certain examples, the auxiliary data can include temperature information, such as from the host device 105 (e.g., from a temperature circuit or temperature sensor at the host device 105, etc.). In other examples, the host device 105 can provide data to the storage system 110 without temperature information, and the storage system 110 can be configured to augment the data received from the host device 105 with temperature information, such as when the data is stored in the storage system 110, for example, in one or more memory devices of the non-volatile memory device 112.

The storage system 110 can include a temperature circuit 117 configured to determine a statistical measure of temperature information for one or more groups of memory cells, for example, using temperature information received from the host device 105, the storage system 110, or one or more other sensor or component configured to provide temperature information, such as at the time the storage system 110 writes received information to the one or more groups of memory cells. In an example, the temperature circuit 117 can be a component of the memory controller 111. In other examples, the temperature circuit 117 can be a component of the storage system 110 separate from the memory controller 111. In an example, the temperature circuit 117 can be configured to receive information from the temperature sensor 118. In an example, the storage system 110 can include a single temperature sensor 118. In other examples, the storage system 110 can include multiple temperature sensors, including a temperature sensor associated with one or more of the non-volatile memory devices 112, the memory controller 111, or one or more other groups or combinations of regions, zones, components, areas, etc.

Figure 2:
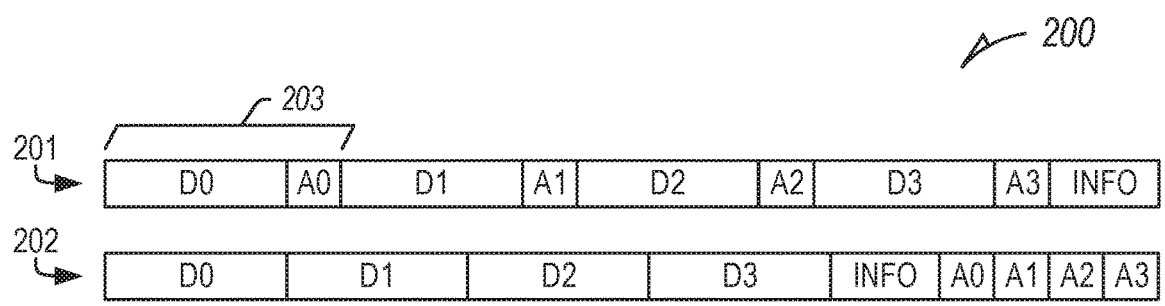
FIG. 2 illustrates example storage configurations for user and auxiliary data in a group or sub-group of memory cells.

FIG. 2 illustrates example storage configurations for user data (e.g., D0-D3) and auxiliary data (A0-A3) in a block or other group (or in certain examples, sub-group) of memory cells. A first block 201 stores user data (e.g., D0) and auxiliary data (e.g., A0) heterogeneously throughout the block, such as in separate pages (e.g., a first page 203 including D1 and A0), as received from a memory controller, etc. A second block 202 stores user data separately from auxiliary data. Data structures for table region tracking, etc., ("INFO") can be stored on the block, in the first block 201 separately from the user and auxiliary data, and in the second block 202 with the auxiliary data. Auxiliary data can include metadata and flags, as well as other information, such as ECC information, CRC information, etc. The auxiliary data can include temperature information, such as measured by or received from the host device 105 or the storage system 110, for each page or chunk of data stored or written in the storage system, such as in the auxiliary data.

The present inventor has recognized, however, that storing the temperature information blended with the data which it refers to, makes it available only after the read operation has been completed and thus can't be used to prevent errors. Accordingly, an abridged table of statistical measures of temperature information can be created and stored, such as in static memory of the memory controller, for a group of memory cells (e.g., a block, a super block, a window, a super window, etc.), such that the system can determine one or more parameters for memory operations at an initial read operation.

The statistical measures of temperature information can be determined using a temperature circuit (e.g., the temperature circuit 117) or the memory controller and stored, such as in static memory of the storage system. The level of statistical information can vary. In an example, a single measure of temperature information can be determined and stored for each block, aggregating temperature information across each written page in a block with the single measure, such as a mean temperature. The mean temperature can be determined for each written page in the block in separate measures, such as during idle time, start-up, initialization, or one or more specified periods of operation, or separately, determined as each page is touched during normal operation, such as in between hard resets or storage system power cycles. In other examples, a specified distribution of temperature information can be sampled of written data across the block, a random distribution across the block, or a pseudo-random or pseudo-specified distribution based on, for example, the number of pages written in the block or the specific pages written in the block. In other examples, other single measures can be stored, such as a max temperature or a min temperature. In other examples, multiple measures can be stored, such as two or more of a mean temperature, a max temperature, a minimum temperature, a standard deviation, a coefficient of variation, a median, etc. In other examples, indications of write temperatures being within a range of temperatures (different zones) can be stored (e.g., a first range below 0° C., a second range between 0° C. and 30° C., a third range between 30° C. and 60° C., and a fourth range greater than 60° C., etc.). In other examples, other temperature ranges or numbers of temperature ranges can be used. The number of pages (or specific pages) assigned to each zone or range can be stored. Although described above with respect to (or other group of memory cells, in specific examples, larger than a block, such as a super block, a window, a super window, etc.)

Although described above with respect to blocks, in other examples, the group of memory cells can include groups larger than a block, such as a super block, a window, a super window, or one or more other groups larger than a block. For each step-up in organization (e.g., from a page to a block, from a block to a super block, from a super block to a window, from a window to a super window, etc.), the amount of stored information and required overhead decreases, however, in instances of variance among groups of memory cells, the positive impact can decrease as individual groups of memory cells fall outside the stored statistical measures, and errors occur. In such examples, for those groups of memory cells falling outside the stored statistical measures, traditional temperature compensation mechanisms, specific to the specific data being read, will be triggered. In yet other examples, groups of memory cells smaller than a block, such as a group of pages, etc., can be used. However, in such instances, the amount of overhead increases, which can be burdensome.

Figure 3:
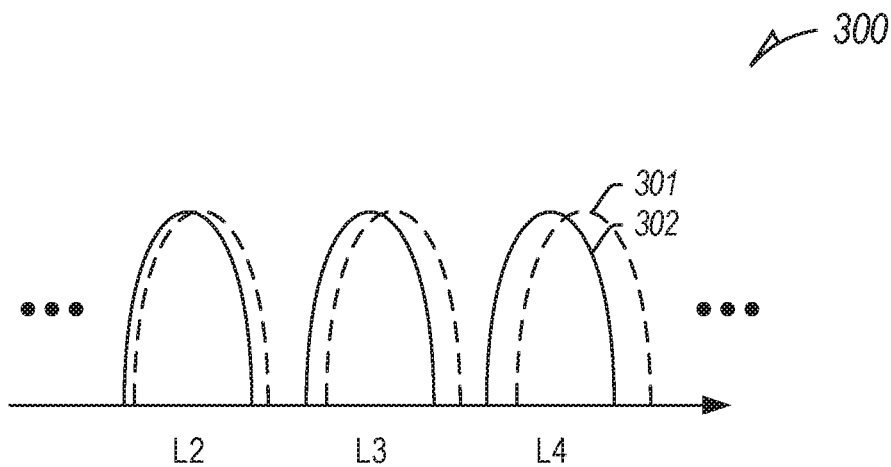
FIG. 3 illustrates an example write (programming) distributions at different levels and write temperatures.

FIG. 3 illustrates an example write (programming) distributions 300 at different levels and write temperatures. A first distribution 301 illustrates first, second, and third levels (level 2 (L2), level 3 (L3), and level 4 (L4)) at a first write temperature, and a second distribution 302 illustrates the first, second, and third levels at a second write temperature lower than the first write temperature (e.g., the first write temperature can be 70° C. and the second write temperature can be 0° C., etc.). Such levels, numbers of levels, distributions, temperatures, and temperature variations are illustrative, and in other examples, can vary. In other examples, just as write temperatures affect distributions, read temperatures can also affect distributions.

When selecting, adjusting, optimizing, or calibrating one or more read thresholds, it can be beneficial to use at least one, but often both the write temperature and the read temperature, as well as other information, such as a read/write count, etc., such as disclosed in the commonly assigned Muchherla et al. U.S. application Ser. No. 14/644,365 titled "Temperature Related Error Management," hereby incorporated by reference in its entirety.

Figure 4:
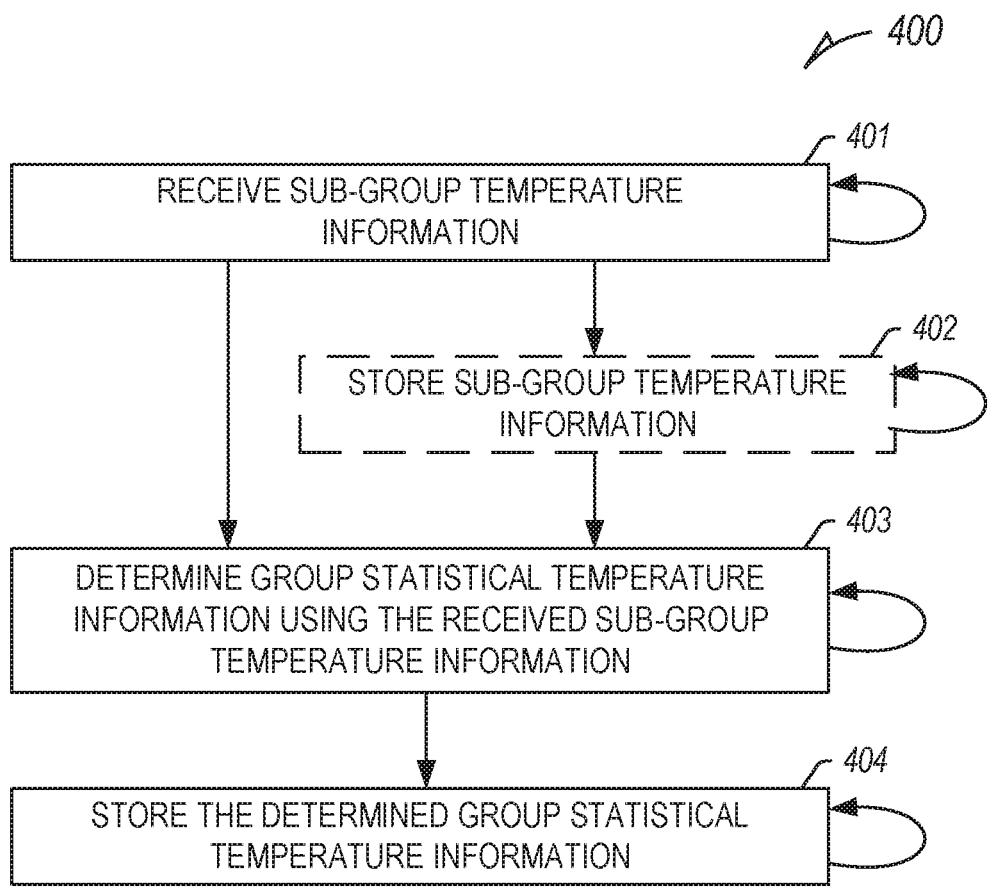
FIGS. 4-6 illustrate example methods to improve one or more storage system operations.

FIG. 4 illustrates an example method 400 to improve one or more storage system operations. The storage system can include multiple groups of non-volatile memory cells, and each of the multiple groups of non-volatile memory cells can include multiple sub-groups. The groups can include combinations and sub-combinations of memory devices, planes, windows, super blocks, blocks, super pages, pages, or memory cells. Sub-groups can include a division of a group. With respect to temperature information, the smallest sub-group is often a page. The storage system can include control circuitry. The control circuitry can include a memory controller, a temperature circuit, one or more device controllers, or combinations thereof.

At 401, sub-group temperature information can be received, such as by control circuitry of the storage system. The sub-group temperature information can include temperature information corresponding to a write temperature of at least one page (e.g., two or more pages, a threshold number of pages, etc.) of a first group of non-volatile memory cells. In other examples, the sub-group temperature information can include one or more other groups of memory cells at an organization level at or below a block, a super block, a window, a plane, a device, etc. In an example, the temperature information can be read from auxiliary data of a page, or one or more other sub-groups, of memory cells. In other examples, the temperature information can be received as the page, or one or more other sub-groups, of memory cells are written, moved, or updated, etc.

At 402, the received sub-group temperature information (e.g., temperature information for individual pages) can be stored, such as in a data structure of the storage device (e.g., one or more arrays, tables, etc.) in non-volatile memory of the storage system, such as to be loaded in response to one or more trigger conditions (e.g., garbage collection, fold operation, an extended read operation, etc.).

At 403, group statistical temperature information can be determined, representative of a group of non-volatile memory cells, using the received sub-group temperature information. The difference between using the stored temperature information and using a determined group statistical information is significant, and can improve the success of operations involving read operations at first read (e.g., without a failed read and recovery, in certain examples, including recovering stored temperature information), or the time to a successful first read, etc.

In an example, control circuitry can determine one or more statistical measures of temperature information for the first group of non-volatile memory cells using the received temperature information. The statistical measures can include at least one of a mean temperature, a maximum temperature, a minimum temperature, a variance, a standard deviation, a distribution of temperature information for the first group of non-volatile memory cells (e.g., in one or more previously or dynamically defined ranges), or combinations thereof, using the received temperature information of the at least one page of the first group of memory cells.

In an example, the statistical measure of temperature information for a specific group of memory cells, such as the first group, can be determined using temperature information from a single page or sub-group. In other examples, the statistical information can be determined using temperature information from two or more pages or sub-groups, providing a better representation across the group. In one example, if a memory operation is requested on a single page or a single sub-group group of a group memory cells where the control circuitry has not received temperature information, or if such information is stale, or received after a threshold time (a number of hours, days, etc.), trigger condition (e.g., hard reset, restart, etc.), or number of operations (e.g., 1,000, etc.), the control circuitry can repeat the memory operation for another sequential, random, or opposite page or sub-group (a relative substantial distance from the single page or sub-group) to receive first and second temperature information to determine a statistical measure of temperature information for the group with two or more measurements.

In an example, a statistical measure can be determined or updated for each group as each group is used by the storage system. In other examples, a memory operation can be performed to specifically determine a statistical measure for each of multiple groups of the storage system. The multiple groups may consist of each of the multiple groups of the storage system, or in other examples, a number less than the whole, such as each of the multiple groups configured to store user or auxiliary data (e.g., excluding FW, etc.), groups including frequently-used or accessed data, a random or representative sampling of groups of the storage system, etc.

In an example, the storage device can, at the time data is written, store statistical measures of temperature information, such as a mean temperature, a max temperature, a minimum temperature, a number of write temperatures outside of an upper or lower threshold or one or more specified ranges, or combinations thereof. In an example, a statistical measure need not be determined for any individual group of memory cells until a single individual write temperature of the storage system (or a threshold number or rate of individual write temperatures) fall outside of one or more predefined boundaries or conditions (e.g., above an upper threshold, below a lower threshold, outside of one or more ranges, etc.). Until such time, each group or sub-group can be assigned to a single measure, such as the mean temperature, etc., or no temperature information can be assigned at all, and the single measure can be an assumed, default measure. After such time, specific statistical measures of temperature information can be determined and stored each group, or only for each group falling outside the one or more predefined boundaries or conditions.

At 404, the determined group statistical temperature information, such as for the sub-group, the group including the sub-group, etc., can be stored. In an example, control circuitry can store the determined statistical measure of temperature information for the first group of non-volatile memory cells, such as for use to optimize or improve a storage system operation, e.g., adjusting a read process, threshold voltage, a group on which to perform a memory operation, etc.

In an example, a data structure including one or more of the determined statistical measures for each group of memory cells (or for a specified set of groups) can be stored in volatile memory of the storage system (e.g., static memory supporting the memory controller, etc.), such as to be available for use without a read operation of the non-volatile memory cells. In other examples, the abridged table can be backed up or stored in non-volatile memory and loaded in response to one or more trigger conditions (e.g., garbage collection, times of heavy usage, random data reads, etc.).

Group or sub-group statistical measures or temperature information can be determined or stored as one or more bits in a table or data structure defining each group or sub-group, or otherwise indicating the one or more bits associated with a specific group or sub-group. For example, a single bit can indicate if the temperature information or statistical measure of temperature information is inside or outside a specified range. Multiple bits can be used to indicate a number of ranges or a number of different statistical measures (e.g., mean temperature, max temperature, minimum temperature, number of measurements within a group, number of measurements within a specific range, etc.). In an example, a number of temperature profiles can be determined having an acceptable number of measurements inside or outside one or more specified ranges, etc., and each group can be assigned to a closest fitting one of the number of temperature profiles. For example, a first temperature profile can include a first threshold number of measurements within a range (e.g., >80%, etc.), with less than a second threshold number of measurements falling above or below the range (e.g., <10% below and <10% above, etc.). An example range can be between 0° C. and 60° C., etc. A second temperature profile can include the first threshold number of measurements within the range (e.g., >80%, etc.), with none falling below the range and less than a third threshold number of measurements above the range (e.g., <20%, etc.). Other example ranges and thresholds can be defined, and groups of memory cells can be assigned to a matching or closest fitting profile, such as by the control circuitry.

Figure 5:
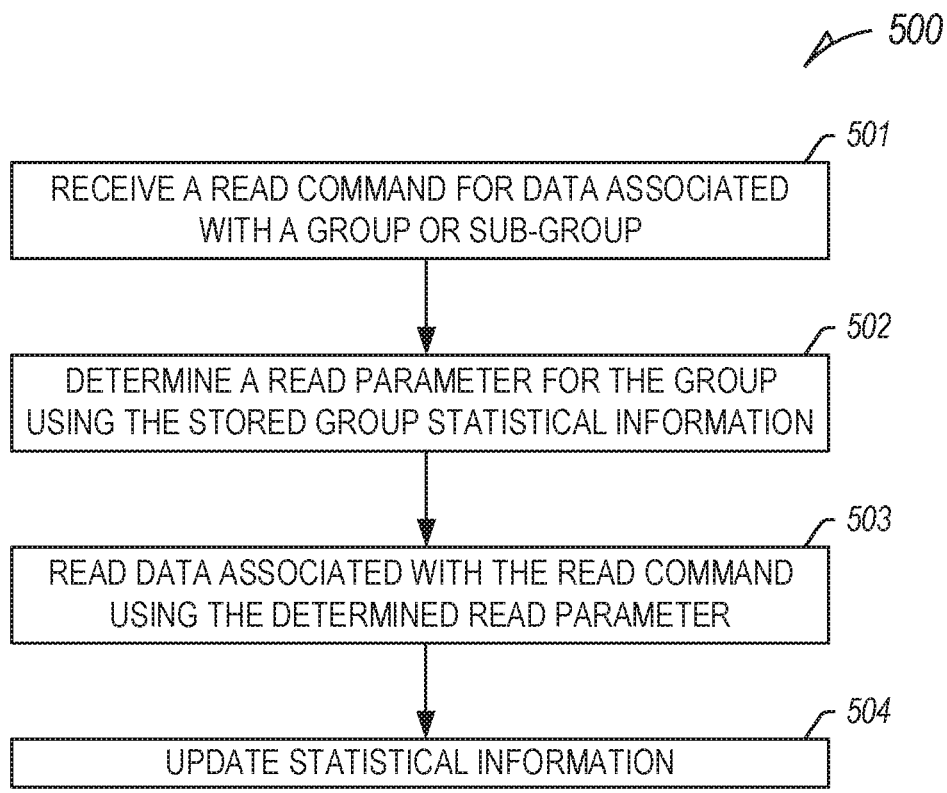

FIG. 5 illustrates an example method 500 to optimize or improve one or more storage system operations. At 501, a read command for data associated with a group or sub-group can be received. At 502, a read parameter, such as one or more voltage thresholds, for the group can be determined using the stored group statistical information, and, in certain examples, an indication of the current temperature, or one or more other parameters, such as described above. At 503, data associated with the read command can be read using the determined read parameter. In some implementation and circumstances, at 504, the statistical information can optionally be updated, refined, or integrated using write temperature information retrieved during the read operation.

For example, the temperature can rise during sequential write operations, such as due to self-heating caused by the write or the operation leading to the write, etc. During a sequential write operation, or if a sequential write operation is detected, the rise in temperature information for that sequential write can be recorded. Sequentially written data is often read in the same order as it is written. The read levels can be adapted during a sequential read of such data to accommodate the changing temperature information.

In other examples, an indication of one or more other memory operations can be received or determined, and a parameter of one or more of the operations can be selected or determined using the stored group statistical information, such as a candidate block for a fold operation, etc.

Figure 6:
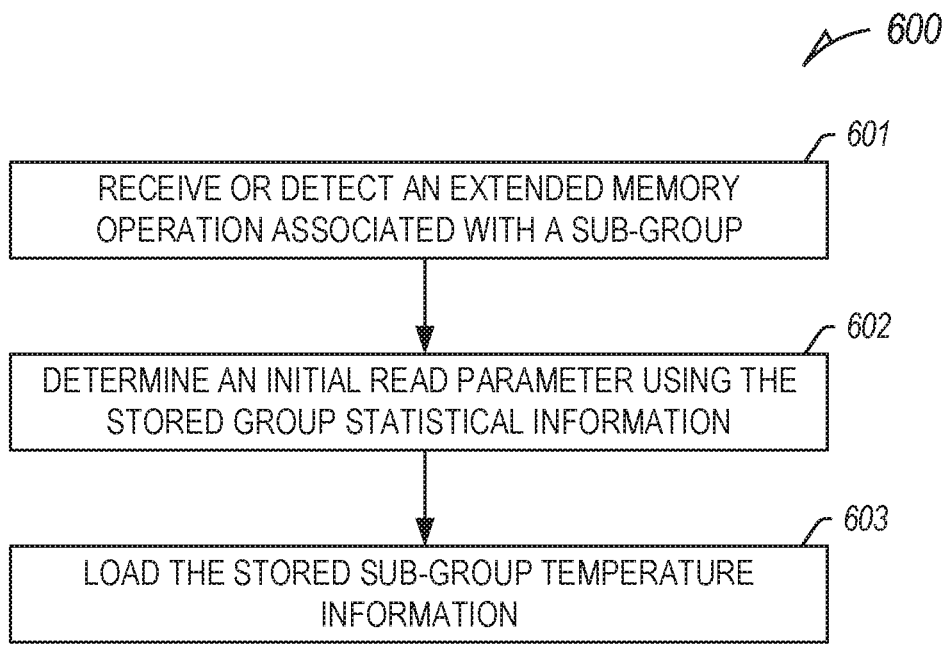

FIG. 6 illustrates an example method 600 to optimize or improve one or more storage system operations. At 601, an extended memory operation associated with a sub-group of non-volatile memory cells can be received or detected.

At 602, an initial read parameter can be determined using the stored group statistical information. At 603, the stored sub-group temperature information can be loaded. In certain examples, the extended memory operation can continue using the first estimated initial read parameter as the stored sub-group temperature information is loaded, such as from non-volatile memory of the storage system. Once loaded (e.g., into volatile memory, etc.), read parameters can be tailored to specific pages or sub-groups of the extended memory operation. In other examples, in addition to loading the stored sub-group temperature information, the stored information can be updated, refined, or integrated using write temperature information retrieved during each read operation.

Figure 7:
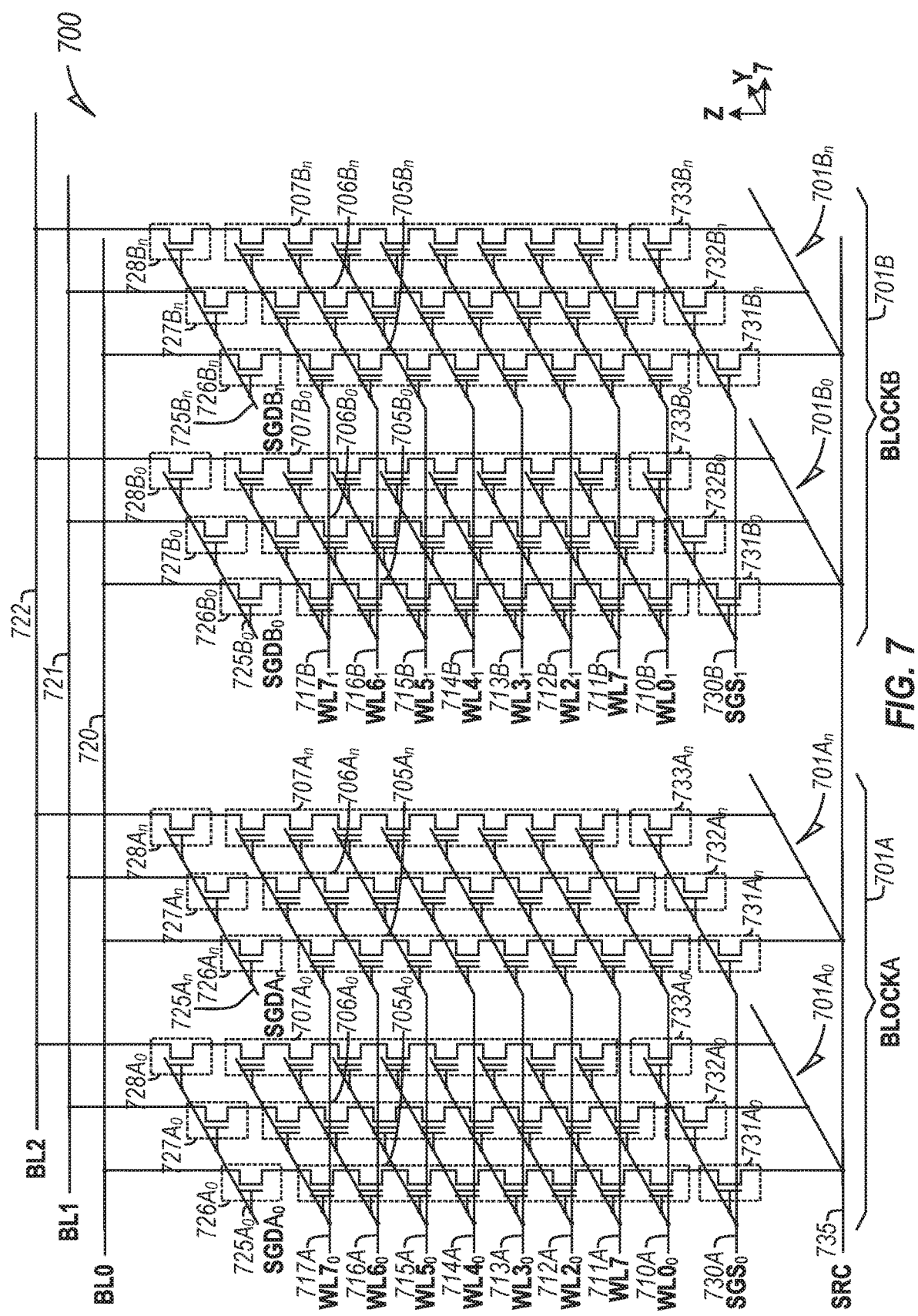
FIG. 7 illustrates an example schematic diagram of a 3D NAND architecture semiconductor memory array.

FIG. 7 illustrates an example schematic diagram of a 3D NAND architecture semiconductor memory array 700 including a number of strings of memory cells (e.g., first-third $A_0$ memory strings 705$A_3$-707$A_0$, first-third $A_n$ memory strings 705$A_n$-707$A_n$, first-third $B_0$ memory strings 705$B_0$-707$B_0$, first-third $B_n$ memory strings 705$B_n$-707$B_n$, etc.), organized in blocks (e.g., block A 701A, block B 701B, etc.) and sub-blocks (e.g., sub-block $A_0$ 701$A_0$, sub-block $A_n$ 701$A_n$, sub-block $B_0$ 701$B_0$, sub-block $B_n$ 701$B_n$, etc.). The memory array 700 represents a portion of a greater number of similar structures that would typically be found in a block, device, or other unit of a memory device.

Each string of memory cells includes a number of tiers of storage transistors (e.g., floating gate, replacement gate, charge trapping structures, etc.) stacked in the Z direction, source to drain, between a source line (SRC) 735 or a source-side select gate (SGS) (e.g., first-third $A_0$ SGS 731$A_0$-733$A_0$, first-third $A_n$ SGS 731$A_n$-733$A_n$, first-third $B_0$ SGS 731$B_0$-733$B_0$, first-third $B_n$ SGS 731$B_n$-733$B_n$, etc.) and a drain-side select gate (SGD) (e.g., first-third $A_0$ SGD 726$A_0$-728$A_0$, first-third $A_n$ SGD 726$A_n$-728$A_n$, first-third $B_0$ SGD 726$B_0$-728$B_0$, first-third $B_n$ SGD 726$B_n$-728$B_n$, etc.). Each string of memory cells in the 3D memory array can be arranged along the X direction as data lines (e.g., bit lines (BL) BL0-BL3 720-722), and along the Y direction as physical pages.

Within a physical page, each tier represents a row of memory cells, and each string of memory cells represents a column. A sub-block can include one or more physical pages. A block can include a number of sub-blocks (or physical pages) (e.g., 128, 256, 384, etc.). Although illustrated herein as having two blocks, each block having two sub-blocks, each sub-block having a single physical page, each physical page having three strings of memory cells, and each string having 8 tiers of memory cells, in other examples, the memory array 700 can include more or fewer blocks, sub-blocks, physical pages, strings of memory cells, memory cells, or tiers. For example, each string of memory cells can include more or fewer tiers (e.g., 16, 32, 64, 128, etc.), as well as one or more additional tiers of semiconductor material above or below the storage transistors (e.g., select gates, data lines, etc.), as desired. As an example, a 48 GB TLC NAND memory device can include 18,592 bytes (B) of data per page (16,384+2208 bytes), 1536 pages per block, 548 blocks per plane, and 4 or more planes per device.

Each memory cell in the memory array 700 includes a control gate (CG) coupled to (e.g., electrically or otherwise operatively connected to) an access line (e.g., word lines (WL) $WL0_0$-$WL7_0$ 710A-717A, $WL0_1$-$WL7_1$ 710B-717B, etc.), which collectively couples the control gates (CGs) across a specific tier, or a portion of a tier, as desired. Specific tiers in the 3D memory array, and accordingly, specific memory cells in a string, can be accessed or controlled using respective access lines. Groups of select gates can be accessed using various select lines. For example, first-third $A_0$ SGD 726$A_0$-728$A_0$ can be accessed using an $A_0$ SGD line $SGDA_0$ 725$A_0$, first-third $A_n$ SGD 726$A_n$-728$A_n$ can be accessed using an $A_n$ SGD line $SGDA_n$ 725$A_n$, first-third $B_0$ SGD 726$B_0$-728$B_0$ can be accessed using a $B_0$ SGD line $SGDB_0$ 725$B_0$, and first-third $B_n$ SGD 726$B_n$-728$B_n$ can be accessed using a $B_n$ SGD line $SGDB_n$ 725$B_n$. First-third $A_0$ SGS 731$A_3$-733$A_0$ and first-third $A_n$ SGS 731$A_n$-733$A_n$ can be accessed using a gate select line $SGS_0$ 730A, and first-third $B_0$ SGS 731$B_0$-733$B_0$ and first-third $B_n$ SGS 731$B_n$-733$B_n$ can be accessed using a gate select line $SGS_1$ 730B.

In an example, the memory array 700 can include a number of levels of semiconductor material (e.g., polysilicon, etc.) configured to couple the control gates (CGs) of each memory cell or select gate (or a portion of the CGs or select gates) of a respective tier of the array. Specific strings of memory cells in the array can be accessed, selected, or controlled using a combination of bit lines (BLs) and select gates, etc., and specific memory cells at one or more tiers in the specific strings can be accessed, selected, or controlled using one or more access lines (e.g., word lines).

In a NAND architecture semiconductor memory array, the state of a selected memory cell can be accessed by sensing a current or voltage variation associated with a particular data line containing the selected memory cell. The memory array 700 can be accessed (e.g., by a control circuit, one or more processors, digital logic, etc.) using one or more drivers. In an example, one or more drivers can activate a specific memory cell, or set of memory cells, by driving a particular potential to one or more data lines (e.g., bit lines BL0-BL2), access lines (e.g., word lines WL0-WL7), or select gates, depending on the type of operation desired to be performed on the specific memory cell or set of memory cells.

To program or write data to a memory cell, a programming voltage (Vpgm) (e.g., one or more programming pulses, etc.) can be applied to selected word lines (e.g., $WL4_0$), and thus, to a control gate of each memory cell coupled to the selected word lines. Programming pulses can begin, for example, at or near 15V, and, in certain examples, can increase in magnitude during each programming pulse application. While the program voltage is applied to the selected word lines, a potential, such as a ground potential (e.g., Vss), can be applied to the data lines (e.g., bit lines)

and substrates (and thus the channels, between the sources and drains) of the memory cells targeted for programming, resulting in a charge transfer (e.g., direct injection or Fowler-Nordheim (FN) tunneling, etc.) from the channels to the floating gates of the targeted memory cells.

In contrast, a pass voltage (Vpass) can be applied to one or more word lines having memory cells that are not targeted for programming, or an inhibit voltage (e.g., Vcc) can be applied to data lines (e.g., bit lines) having memory cells that are not targeted for programming, for example, to inhibit charge from being transferred from the channels to the floating gates of such non-targeted memory cells. The pass voltage can be variable, depending, for example, on the proximity of the applied pass voltages to a word line targeted for programming. The inhibit voltage can include a supply voltage (Vcc), such as a voltage from an external source or supply (e.g., a battery, an AC-to-DC converter, etc.), relative to a ground potential (e.g., Vss).

As an example, if a programming voltage (e.g., 15 V or more) is applied to a specific word line, such as $WL4_0$, a pass voltage of 10 V can be applied to one or more other word lines, such as $WL3_0$, $WL5_0$, etc., to inhibit programming of non-targeted memory cells, or to retain the values stored on such memory cells not targeted for programming. As the distance between an applied program voltage and the non-targeted memory cells increases, the pass voltage required to refrain from programming the non-targeted memory cells can decrease. For example, where a programming voltage of 15V is applied to $WL4_0$, a pass voltage of 10V can be applied to $WL3_0$ and $WL5_3$, a pass voltage of 8V can be applied to $WL2_3$ and $WL6_0$, a pass voltage of 7V can be applied to $WL1_0$ and $WL7_0$, etc. In other examples, the pass voltages, or number of word lines, etc., can be higher or lower, or more or less.

Sense amplifiers can be coupled to one or more of the data lines (e.g., first, second, or third bit lines (BL0-BL2) 720-722), can detect the state of each memory cell in respective data lines by sensing a voltage or current on a particular data line.

Between applications of one or more programming pulses (e.g., Vpgm), a verify operation can be performed to determine if a selected memory cell has reached its intended programmed state. If the selected memory cell has reached its intended programmed state, it can be inhibited from further programming. If the selected memory cell has not reached its intended programmed state, additional programming pulses can be applied. If the selected memory cell has not reached its intended programmed state after a particular number of programming pulses (e.g., a maximum number), the selected memory cell, or a string, block, or page associated with such selected memory cell, can be marked as defective.

To erase a memory cell or a group of memory cells (e.g., erasure is typically performed in blocks or sub-blocks), an erasure voltage (Vers) (e.g., typically Vpgm) can be applied to the substrates (and thus the channels, between the sources and drains) of the memory cells targeted for erasure (e.g., using one or more bit lines, select gates, etc.), while the word lines of the targeted memory cells are kept at a potential, such as a ground potential (e.g., Vss), resulting in a charge transfer (e.g., direct injection or Fowler-Nordheim (FN) tunneling, etc.) from the floating gates of the targeted memory cells to the channels.

Figure 8:
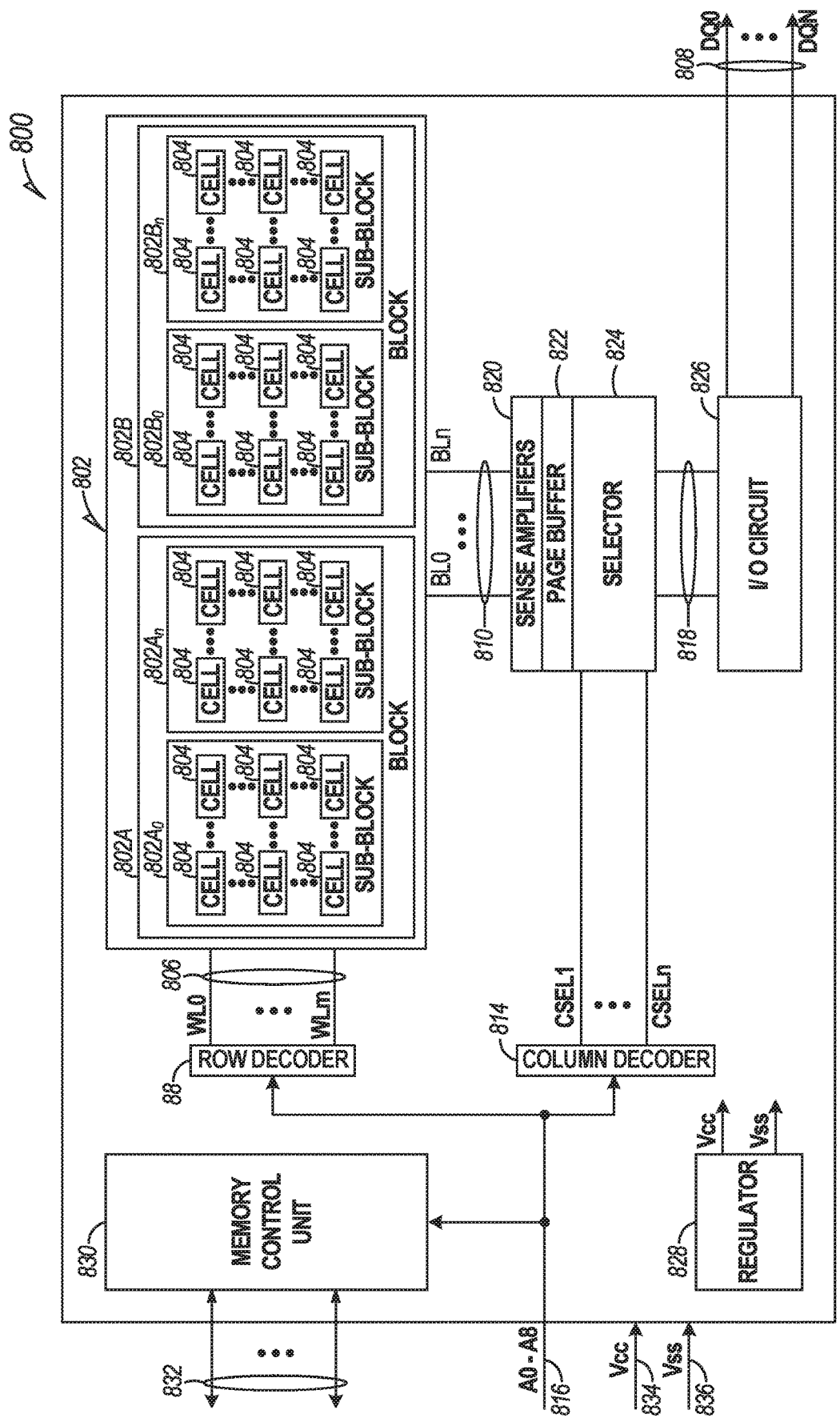
FIG. 8 illustrates an example block diagram of a memory module.

FIG. 8 illustrates an example block diagram of a memory device 800 including a memory array 802 having a plurality of memory cells 804, and one or more circuits or components to provide communication with, or perform one or more memory operations on, the memory array 802. Although shown with a single memory array 802, in other examples, one or more additional memory arrays, dies, or LUNs can be included herein. In certain examples, in a storage system having a number of dies or LUNs, the memory device 800 can represent a block diagram of circuits and components for each die or LUN. The memory device 800 can include a row decoder 812, a column decoder 814, sense amplifiers 820, a page buffer 822, a selector 824, an input/output (I/O) circuit 826, and a memory control unit 830.

The memory cells 804 of the memory array 802 can be arranged in blocks, such as first and second blocks 802A, 802B. Each block can include sub-blocks. For example, the first block 802A can include first and second sub-blocks $802A_0$, $802A_n$, and the second block 802B can include first and second sub-blocks $802B_0$, $802B_n$. Each sub-block can include a number of physical pages, each page including a number of memory cells 804. Although illustrated herein as having two blocks, each block having two sub-blocks, and each sub-block having a number of memory cells 804, in other examples, the memory array 802 can include more or fewer blocks, sub-blocks, memory cells, etc. In other examples, the memory cells 804 can be arranged in a number of rows, columns, pages, sub-blocks, blocks, etc., and accessed using, for example, access lines 806, first data lines 810, or one or more select gates, source lines, etc.

The memory control unit 830 can control memory operations of the memory device 800 according to one or more signals or instructions received on control lines 832, including, for example, one or more clock signals or control signals that indicate a desired operation (e.g., write, read, erase, etc.), or address signals (A0-AX) received on one or more address lines 816. One or more devices external to the memory device 800 can control the values of the control signals on the control lines 832, or the address signals on the address line 816. Examples of devices external to the memory device 800 can include, but are not limited to, a host, a memory controller, a processor, or one or more circuits or components not illustrated in FIG. 8.

The memory device 800 can use access lines 806 and first data lines 810 to transfer data to (e.g., write or erase) or from (e.g., read) one or more of the memory cells 804. The row decoder 812 and the column decoder 814 can receive and decode the address signals (A0-AX) from the address line 816, can determine which of the memory cells 804 are to be accessed, and can provide signals to one or more of the access lines 806 (e.g., one or more of a plurality of word lines (WL0-WLm)) or the first data lines 810 (e.g., one or more of a plurality of bit lines (BL0-BLn)), such as described above.

The memory device 800 can include sense circuitry, such as the sense amplifiers 820, configured to determine the values of data on (e.g., read), or to determine the values of data to be written to, the memory cells 804 using the first data lines 810. For example, in a selected string of memory cells 804, one or more of the sense amplifiers 820 can read a logic level in the selected memory cell 804 in response to a read current flowing in the memory array 802 through the selected string to the data lines 810.

One or more devices external to the memory device 800 can communicate with the memory device 800 using the I/O lines (DQ0-DON) 808, address lines 816 (A0-AX), or control lines 832. The input/output (I/O) circuit 826 can transfer values of data in or out of the memory device 800, such as in or out of the page buffer 822 or the memory array 802, using the I/O lines 808, according to, for example, the control lines 832 and address lines 8:16. The page buffer 822 can store data received from the one or more devices external to the memory device 800 before the data is programmed into relevant portions of the memory array 802, or can store data read from the memory array 802 before the data is transmitted to the one or more devices external to the memory device 800.

The column decoder 814 can receive and decode address signals (A0-AX) into one or more column select signals (CSEL1-CSELn). The selector 824 (e.g., a select circuit) can receive the column select signals (CSEL1-CSELn) and select data in the page buffer 822 representing values of data to be read from or to be programmed into memory cells 804. Selected data can be transferred between the page buffer 822 and the I/O circuit 826 using second data lines 818.

The memory control unit 830 can receive positive and negative supply signals, such as a supply voltage (Vcc) 834 and a negative supply (Vss) 836 (e.g., a ground potential), from an external source or supply (e.g., an internal or external battery, an AC-to-DC converter, etc.). In certain examples, the memory control unit 830 can include a regulator 828 to internally provide positive or negative supply signals.

Figure 9:
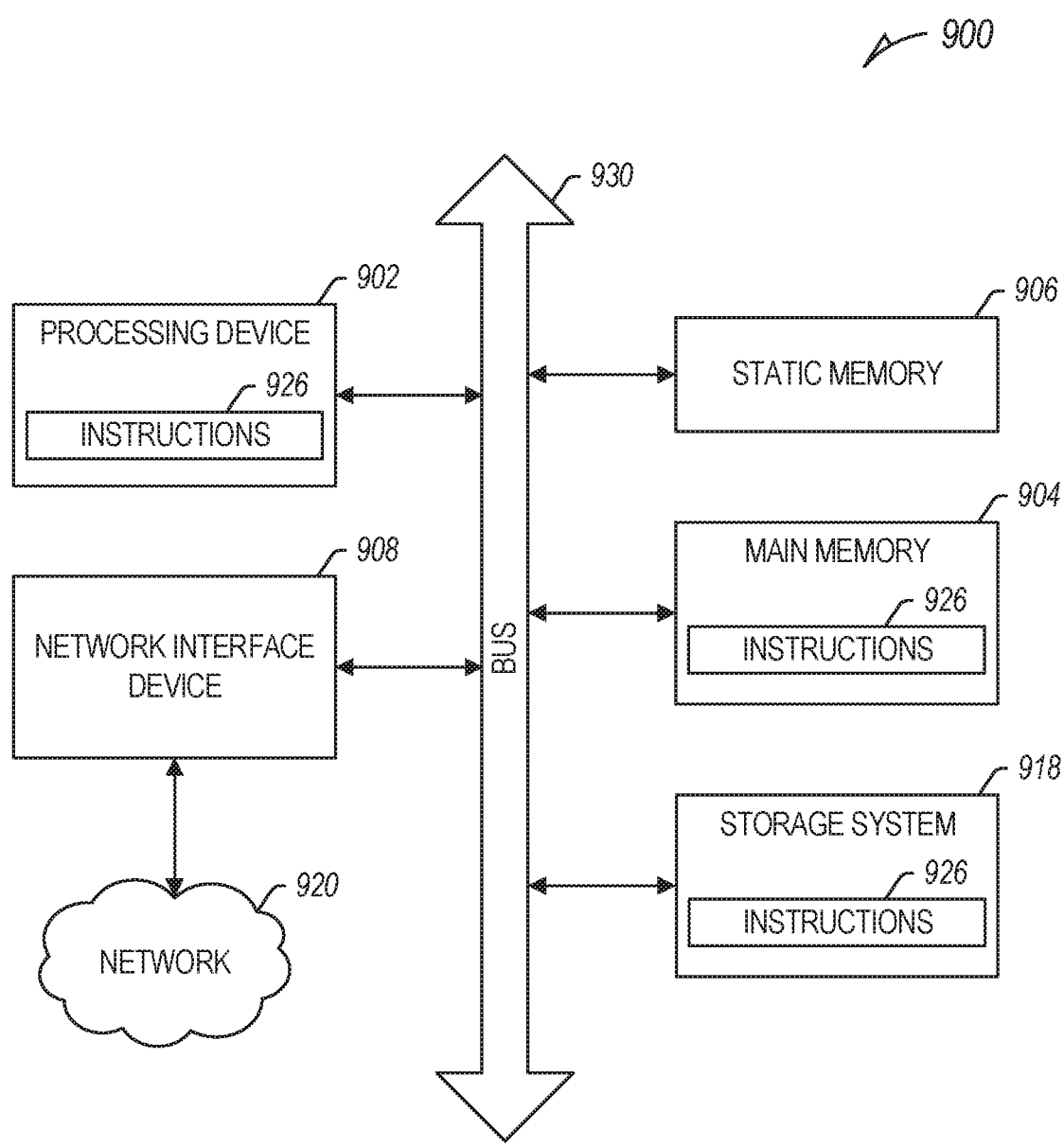
FIG. 9 illustrates an example block diagram of an information handling system.

FIG. 9 illustrates a block diagram of an example machine (e.g., a host system) 900 upon which any one or more of the techniques (e.g., methodologies) discussed herein may perform (e.g., such as those described in FIG. 1, etc.). In alternative embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environment. The machine 900 may be a personal computer (PC), a tablet PC, a set-top box (STB), a personal digital assistant (PDA), a mobile telephone, a web appliance, an IoT device, automotive system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic, components, devices, packages, or mechanisms. Circuitry is a collection (e.g., set) of circuits implemented in tangible entities that include hardware (e.g., simple circuits, gates, logic, etc.). Circuitry membership may be flexible over time and underlying hardware variability. Circuitries include members that may, alone or in combination, perform specific tasks when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

The machine (e.g., computer system, a host system, etc.) 900 may include a processing device 902 (e.g., a hardware processor, a central processing unit (CPU), a graphics processing unit (GPU), a hardware processor core, or any combination thereof, etc.), a main memory 904 (e.g., read-only memory (ROM), dynamic random-access memory (DRAM) such as synchronous DRAM (SDRAM) or Rambus DRAM (RDRAM), etc.), a static memory 906 (e.g., static random-access memory (SRAM), etc.), and a storage system 918, some or all of which may communicate with each other via a communication interface (e.g., a bus) 930.

The processing device 902 can represent one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 902 can also be one or more special-purpose processing devices such as an application specific integrated circuit (ASIC), a field programmable gate array (FPGA), a digital signal processor (DSP), network processor, or the like. The processing device 902 can be configured to execute instructions 926 for performing the operations and steps discussed herein. The computer system 900 can further include a network interface device 908 to communicate over a network 920.

The storage system 918 can include a machine-readable storage medium (also known as a computer-readable medium) on which is stored one or more sets of instructions 926 or software embodying any one or more of the methodologies or functions described herein. The instructions 926 can also reside, completely or at least partially, within the main memory 904 or within the processing device 902 during execution thereof by the computer system 900, the main memory 904 and the processing device 902 also constituting machine-readable storage media.

The term "machine-readable storage medium" should be taken to include a single medium or multiple media that store the one or more sets of instructions, or any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The machine 900 may further include a display unit, an alphanumeric input device (e.g., a keyboard), and a user interface (UI) navigation device (e.g., a mouse). In an example, one or more of the display unit, the input device, or the UI navigation device may be a touch screen display. The machine a signal generation device (e.g., a speaker), or one or more sensors, such as a global positioning system (GPS) sensor, compass, accelerometer, or one or more other sensor. The machine 900 may include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The instructions 926 (e.g., software, programs, an operating system (OS), etc.) or other data are stored on the storage system 918 can be accessed by the main memory 904 for use by the processing device 902. The main memory 904 (e.g., DRAM) is typically fast, but volatile, and thus a different type of storage than the storage system 918 (e.g., an SSD), which is suitable for long-term storage, including while in an "off" condition. The instructions 926 or data in use by a user or the machine 900 are typically loaded in the main memory 904 for use by the processing device 902. When the main memory 904 is full, virtual space from the storage system 918 can be allocated to supplement the main memory 904; however, because the storage system 918 device is typically slower than the main memory 904, and write speeds are typically at least twice as slow as read speeds, use of virtual memory can greatly reduce user experience due to storage system latency (in contrast to the main memory 904, e.g., DRAM). Further, use of the storage system 918 for virtual memory can greatly reduce the usable lifespan of the storage system 918.

The instructions 924 may further be transmitted or received over a network 920 using a transmission medium via the network interface device 908 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 908 may include one or more physical jacks (e.g., Ethernet, coaxial, or phone jacks) or one or more antennas to connect to the network 920. In an example, the network interface device 908 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 900, and includes digital or analog communications signals or other intangible medium to facilitate communication of such software.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In various examples, the components, controllers, processors, units, engines, or tables described herein can include, among other things, physical circuitry or firmware stored on a physical device. As used herein, "processor" means any type of computational circuit such as, but not limited to, a microprocessor, a microcontroller, a graphics processor, a digital signal processor (DSP), or any other type of processor or processing circuit, including a group of processors or multi-core devices.

The term "horizontal" as used in this document is defined as a plane parallel to the conventional plane or surface of a substrate, such as that underlying a wafer or die, regardless of the actual orientation of the substrate at any point in time. The term "vertical" refers to a direction perpendicular to the horizontal as defined above. Prepositions, such as "on," "over," and "under" are defined with respect to the conventional plane or surface being on the top or exposed surface of the substrate, regardless of the orientation of the substrate; and while "on" is intended to suggest a direct contact of one structure relative to another structure which it lies "on" (in the absence of an express indication to the contrary); the terms "over" and "under" are expressly intended to identify a relative placement of structures (or layers, features, etc.), which expressly includes—but is not limited to—direct contact between the identified structures unless specifically identified as such. Similarly, the terms "over" and "under"

are not limited to horizontal orientations, as a structure may be "over" a referenced structure if it is, at some point in time, an outermost portion of the construction under discussion, even if such structure extends vertically relative to the referenced structure, rather than in a horizontal orientation.

The terms "wafer" and "substrate" are used herein to refer generally to any structure on which integrated circuits are formed, and also to such structures during various stages of integrated circuit fabrication. The following detailed description is, therefore, not to be taken in a limiting sense, and the scope of the various embodiments is defined only by the appended claims, along with the full scope of equivalents to which such claims are entitled.

Various embodiments according to the present disclosure and described herein include memory utilizing a vertical structure of memory cells (e.g., NAND strings of memory cells). As used herein, directional adjectives will be taken relative a surface of a substrate upon which the memory cells are formed (i.e., a vertical structure will be taken as extending away from the substrate surface, a bottom end of the vertical structure will be taken as the end nearest the substrate surface and a top end of the vertical structure will be taken as the end farthest from the substrate surface).

As used herein, directional adjectives, such as horizontal, vertical, normal, parallel, perpendicular, etc., can refer to relative orientations, and are not intended to require strict adherence to specific geometric properties, unless otherwise noted. For example, as used herein, a vertical structure need not be strictly perpendicular to a surface of a substrate, but may instead be generally perpendicular to the surface of the substrate, and may form an acute angle with the surface of the substrate (e.g., between 60 and 120 degrees, etc.).

In some embodiments described herein, different doping configurations may be applied to a select gate source (SGS), a control gate (CG), and a select gate drain (SGD), each of which, in this example, may be formed of or at least include polysilicon, with the result such that these tiers (e.g., polysilicon, etc.) may have different etch rates when exposed to an etching solution. For example, in a process of forming a monolithic pillar in a 3D semiconductor device, the SGS and the CG may form recesses, while the SGD may remain less recessed or even not recessed. These doping configurations may thus enable selective etching into the distinct tiers (e.g., SGS, CG, and SGD) in the 3D semiconductor device by using an etching solution (e.g., tetramethylammonium hydroxide (TMCH)).

Operating a memory cell, as used herein, includes reading from, writing to, or erasing the memory cell. The operation of placing a memory cell in an intended state is referred to herein as "programming," and can include both writing to or erasing from the memory cell (i.e., the memory cell may be programmed to an erased state).

According to one or more embodiments of the present disclosure, a memory controller (e.g., a processor, controller, firmware, etc.) located internal or external to a memory device, is capable of determining (e.g., selecting, setting, adjusting, computing, changing, clearing, communicating, adapting, deriving, defining, utilizing, modifying, applying, etc.) a quantity of wear cycles, or a wear state (e.g., recording wear cycles, counting operations of the memory device as they occur, tracking the operations of the memory device it initiates, evaluating the memory device characteristics corresponding to a wear state, etc.)

According to one or more embodiments of the present disclosure, a memory access device may be configured to provide wear cycle information to the memory device with each memory operation. The memory device control circuitry (e.g., control logic) may be programmed to compensate for memory device performance changes corresponding to the wear cycle information. The memory device may receive the wear cycle information and determine one or more operating parameters (e.g., a value, characteristic) in response to the wear cycle information.

It will be understood that when an element is referred to as being "on," "connected to" or "coupled with" another element, it can be directly on, connected, or coupled with the other element or intervening elements may be present. In contrast, when an element is referred to as being "directly on," "directly connected to" or "directly coupled with" another element, there are no intervening elements or layers present. If two elements are shown in the drawings with a line connecting them, the two elements can be either be coupled, or directly coupled, unless otherwise indicated.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMS), read only memories (ROMs), and the like.

In Example 1, subject matter (e.g., a storage system) may comprise a first group of non-volatile memory cells, the first group comprising multiple pages of memory cells; control circuitry configured to: receive temperature information corresponding to a write temperature of at least one page of the first group of non-volatile memory cells; determine a statistical measure of temperature information for the first group of non-volatile memory cells using the received temperature information; and store the determined statistical measure of temperature information for the first group of non-volatile memory cells.

In Example 2, the subject matter of Example 1 may optionally be configured such that, to determine the statistical measure of temperature information for the first group of non-volatile memory cells, the control circuitry is configured to determine at least one metric, the at least one metric including at least one of a mean temperature, a maximum temperature, a minimum temperature, a variance, a standard deviation, or a distribution of temperature information for the first group of non-volatile memory cells using the received temperature information of the at least one page of the first group of memory cells, the first group of non-volatile memory cells comprises a super block or a window, and, to receive temperature information, the control circuitry is configured to receive temperature information corresponding to write temperatures of two or more pages of the first group of non-volatile memory cells.

In Example 3, the subject matter of any one or more of Examples 1-2 may optionally be configured such that the control circuitry comprises a memory controller configured to: receive a read command for data associated with at least a portion of the first group of non-volatile memory cells, and the control circuitry is configured to: determine a read parameter for the first group of non-volatile memory cells using the stored statistical measure of temperature information for the first group of non-volatile memory cells; and read data from the first group of non-volatile memory cells in response to the read command using the determined read parameter.

In Example 4, the subject matter of any one or more of Examples 1-3 may optionally comprise a temperature sensor configured to detect a temperature indication, wherein the control circuitry comprises a memory controller configured to: receive a write command and user data associated with the write command from a host device; receive temperature information from the temperature sensor; augment auxiliary data associated with the user data using the temperature information; and write the user data and the auxiliary data associated with the write command to at least one page of the first group of memory cells.

In Example 5, the subject matter of any one or more of Examples 1-4 may optionally be configured such that the pages of memory cells are organized into multiple blocks, and the control circuitry is configured to: receive current temperature information of the storage system; and determine one of the multiple blocks on which to perform a fold operation using the stored statistical measure of temperature information for the first group of non-volatile memory cells and the current temperature information of the storage system.

In Example 6, the subject matter of any one or more of Examples 1-5 may optionally be configured such that multiple groups of non-volatile memory cells, comprising the first group of non-volatile memory cells, wherein the control circuitry is configured to: receive temperature information corresponding to a write temperature of at least one page of each of the multiple groups of non-volatile memory cells; determine a statistical measure of temperature information for each of the multiple groups of non-volatile memory cells using the received temperature information; and store the determined statistical measures of temperature information for each of the multiple groups of non-volatile memory cells, and wherein the control circuitry is configured to: prior to performing a first memory operation on a selective one of the multiple groups of non-volatile memory cells, determine one of the multiple groups of non-volatile memory cells on which to perform the first memory operation using the stored statistical measures of temperature information.

In Example 7, the subject matter of any one or more of Examples 1-6 may optionally be configured such that the control circuitry is configured to: perform a first memory operation on a first sub-group of the first group of non-volatile memory cells; receive temperature information from the first sub-group of the first group of non-volatile memory cells during the first memory operation; determine the statistical measure of temperature information for the first group of non-volatile memory cells using the received temperature information from the first sub-group of the first group of non-volatile memory cells; and store the received temperature information from the first sub-group of the first group of non-volatile memory cells in a first data structure on the storage system.

In Example 8, the subject matter of any one or more of Examples 1-7 may optionally be configured such that the control circuitry comprises a memory controller configured to: receive a second memory operation associated with a second sub-group of the first group of non-volatile memory cells, and the control circuitry is configured to: prior to reading data associated with the second sub-group of the first group of non-volatile memory cells in response the second memory operation, determine a read parameter for the second sub-group of the first group of non-volatile memory cells using the stored statistical measure of temperature information for the first group of non-volatile memory cells.

In Example 9, the subject matter of any one or more of Examples 1-8 may optionally be configured such that the control circuitry comprises a memory controller configured to: receive or detect an extended memory operation associated with the first sub-group of the first group of non-volatile memory cells, the extended memory operation including a fold operation or a sequential read operation; and the control circuitry is configured to: prior to reading data associated with the extended memory operation, determine an initial read parameter using the stored statistical measure of temperature information for the first group of non-volatile memory cells; and load the stored temperature information from the first sub-group of the first group of non-volatile memory cells from the dedicated first data structure.

In Example 10, the subject matter of any one or more of Examples 1-9 may optionally be configured such that the first memory operation includes a read operation or a garbage collection operation, the first group of non-volatile memory cells includes a first super page of non-volatile memory cells, the first sub-group of the first group of non-volatile memory cells include a first page of non-volatile memory cells, and the control circuitry is configured to: update the first data structure after receiving additional temperature information from the first group of non-volatile memory cells.

In Example 11, the subject matter of any one or more of Examples 1-10 may optionally comprise a memory controller comprising a group of volatile memory cells, the memory controller configured to receive memory operations from a host device separate from the storage system; and a memory device comprising a device controller and the first group of non-volatile memory cells, wherein the control circuitry comprises a group of volatile memory cells and at least one of the memory controller or the device controller and is configured to store the determined statistical measures of temperature information in a table in static memory.

In Example 12, the subject matter of any one or more of Examples 1-11 may optionally be configured such that, to receive temperature information corresponding to the write temperature of at least one page of the first group of non-volatile memory cells, the control circuitry is configured to: receive temperature information corresponding to the write temperature of at least one page of non-volatile memory cells selected in response to a memory operation to determine statistical measures of the temperature information for the first group of non-volatile memory cells; or receive temperature information corresponding to the write temperature of at least one page of non-volatile memory cells associated with a memory operation in which auxiliary data of the at least one page is read.

In Example 13, the subject matter of any one or more of Examples 1-12 may optionally be configured such that the control circuitry is configured to: update the determined statistical measure of temperature information for the first group of non-volatile memory cells, and store the updated determined statistical measure, in response to receiving additional temperature information corresponding to a write temperature of at least one of multiple pages of the first group of non-volatile memory cells.

In Example 14, subject matter (e.g., a method) may comprise receiving, using control circuitry of a storage system, temperature information corresponding to a write temperature of at least one of multiple pages of non-volatile memory cells of each of multiple groups of non-volatile memory cells; determining, using the control circuitry, a statistical measure of temperature information for each of the multiple groups of non-volatile memory cells using the received temperature information; and storing, using the control circuitry, the determined statistical measure of temperature information for each of the multiple groups of non-volatile memory cells.

In Example 15, the subject matter of Example 14 may optionally comprise receiving a read command for data associated with at least a portion of a first group of non-volatile memory cells; prior to performing a read operation in response to the read command, determining a read parameter for the first group of non-volatile memory cells using the stored statistical measure of temperature information for the first group of non-volatile memory cells; and reading data from the first group of non-volatile memory cells in response to the read command using the determined read parameter.

In Example 16, the subject matter of any one or more of Examples 14-15 may optionally be configured such that the pages of memory cells are organized into multiple blocks, the method further comprising: receiving current temperature information of the storage system; and determining one of the multiple blocks on which to perform a fold operation using the stored statistical measure of temperature information for each of the multiple groups of non-volatile memory cells and the current temperature information of the storage system.

In Example 17, the subject matter of any one or more of Examples 14-16 may optionally be configured to comprise, prior to performing a first memory operation on a selective one of the multiple groups of non-volatile memory cells, determining one of the multiple groups of non-volatile memory cells on which to perform the first memory operation using the stored statistical measures of temperature information.

In Example 18, the subject matter of any one or more of Examples 14-17 may optionally be configured to comprise performing a first memory operation on a first sub-group of a first group of the multiple groups of non-volatile memory cells; receiving temperature information from the first sub-group of the first group of non-volatile memory cells during the first memory operation; determining the statistical measure of temperature information for the first group of non-volatile memory cells using the received temperature information from the first sub-group of the first group of non-volatile memory cells; and storing the received temperature information from the first sub-group of the first group of non-volatile memory cells in a first data structure on the storage system.

In Example 19, the subject matter of any one or more of Examples 14-18 may optionally be configured such that receiving a second memory operation associated with a second sub-group of the first group of non-volatile memory cells; and prior to reading data associated with the second sub-group of the first group of non-volatile memory cells in response the second memory operation, determining a read parameter for the second sub-group of the first group of non-volatile memory cells using the stored statistical measure of temperature information for the first group of non-volatile memory cells.

In Example 20, the subject matter of any one or more of Examples 14-19 may optionally be configured such that receiving or detecting an extended memory operation associated with the first sub-group of the first group of non-volatile memory cells, the extended memory operation including a fold operation or a sequential read operation; prior to reading data associated with the extended memory operation, determining an initial read parameter using the stored statistical measure of temperature information for the first group of non-volatile memory cells; and loading the stored temperature information from the first sub-group of the first group of non-volatile memory cells from the dedicated first data structure.

In Example 21, the subject matter of any one or more of Examples 14-20 may optionally be configured such that receiving temperature information corresponding to a write temperature of at least one of multiple pages comprises: receiving temperature information from at least one of the multiple pages of each of the multiple groups of non-volatile memory cells in response to a memory operation to determine statistical measures of temperature information for the multiple groups of non-volatile memory cells; or receiving temperature information from at least one of the multiple pages of each of the multiple groups of non-volatile memory cells in response to separate memory operations for each of the multiple groups.

In Example 22, the subject matter of any one or more of Examples 14-21 may optionally be configured such that updating the determined statistical measures of temperature information, and storing the updated determined statistical measures, in response to receiving additional temperature information corresponding to a write temperature of at least one of the multiple pages of the multiple groups of non-volatile memory cells.

In Example 23, subject matter (e.g., a non-transitory device-readable storage medium) may comprise instructions that, when executed by control circuitry of a storage system, cause the storage system to perform operations comprising: receiving temperature information corresponding to a write temperature of at least one of multiple pages of non-volatile memory cells of each of multiple groups of non-volatile memory cells; determining a statistical measure of temperature information for each of the multiple groups of non-volatile memory cells using the received temperature information; and storing the determined statistical measure of temperature information for each of the multiple groups of non-volatile memory cells.

In Example 24, the subject matter of Example 23 may optionally be configured such that the operations comprise determining, prior to performing a first memory operation on a selective one of the multiple groups of non-volatile memory cells, one of the multiple groups of non-volatile memory cells on which to perform the first memory operation using the stored statistical measures of temperature information.

In Example 25, the subject matter of any one or more of Examples 23-24 may optionally be configured such that the operations comprise updating the determined statistical measures of temperature information, and storing the updated determined statistical measures, in response to receiving additional temperature information corresponding to a write temperature of at least one of the multiple pages of the multiple groups of non-volatile memory cells.

In Example 26, subject matter (e.g., a method) may comprise monitoring temperatures in multiple regions of a memory device during selected operations within such regions; determining at least one metric of monitored temperatures in the regions, the metric selected from the group consisting essentially of the maximum, minimum, mean, variance, standard deviation, coefficient of variation, and distribution of the monitored temperatures; for at least one determined metric relative to a monitored region, storing one or more bits representative of the determined metric; and reading the one or more stored bits for at least one monitored region to determine a region of the memory device in which a memory operation will be performed.

In Example 27, subject matter (e.g., a system or apparatus) may optionally combine any portion or combination of any portion of any one or more of Examples 1-26 to comprise "means for" performing any portion of any one or more of the functions or methods of Examples 1-26, or at least one "non-transitory machine-readable medium" including instructions that, when performed by a machine, cause the machine to perform any portion of any one or more of the functions or methods of Examples 1-26.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A storage system, comprising:
    a memory array comprising multiple groups of non-volatile memory cells, each group comprising multiple pages of memory cells; and
    control circuitry configured to:
        receive temperature information corresponding to a write temperature of at least one page of memory cells;
        determine group statistical measures of temperature information for the multiple groups of non-volatile memory cells using the received temperature information;
        determine a variance of temperature information across the memory array;
        consolidate the multiple groups of non-volatile memory cells into different zones associated with ranges of temperature information using the determined group statistical measures, the ranges dynamic with respect to the determined variance of temperature information across the memory array; and
        store the consolidated zones and groups of non-volatile memory cells associated with the zones in volatile memory supporting the control circuitry to be available for use without a read operation of the non-volatile memory cells.

2. The storage system of claim 1,
    wherein, to determine the group statistical measures of temperature information for the multiple groups of non-volatile memory cells, the control circuitry is configured to determine at least one metric, the at least one metric including at least one of a mean temperature, a maximum temperature, a minimum temperature, a variance, a standard deviation, or a distribution of temperature information for a respective group of non-volatile memory cells using the received temperature information of the at least one page of the respective group of non-volatile memory cells,
    wherein a group of non-volatile memory cells comprises a super block or a stripe of a super block, and
    wherein, to receive temperature information, the control circuitry is configured to receive temperature information corresponding to write temperatures of two or more pages of the respective group of non-volatile memory cells.

3. The storage system of claim 1,
    wherein the control circuitry comprises a memory controller configured to:
        receive a read command for data associated with at least a portion of a first group of non-volatile memory cells, and
    wherein the control circuitry is configured to:
        determine a read parameter for the first group of non-volatile memory cells using the stored consolidated zone for the first group of non-volatile memory cells; and
        read data from the rust group of non-volatile memory cells in response to the read command using the determined read parameter.

4. The storage system of claim 1, comprising:
    a temperature sensor configured to detect a temperature indication,
    wherein the control circuitry comprises a memory controller configured to:
        receive a write command and user data associated with the write command from a host device;
        receive temperature information from the temperature sensor;
        augment auxiliary data associated with the user data using the temperature information; and
        write the user data and the auxiliary data associated with the write command to at least one page of the multiple groups of memory cells.

5. The storage system of claim 1,
    wherein the pages of memory cells are organized into multiple blocks, and
    wherein the control circuitry is configured to:
        receive current temperature information of the storage system; and
        determine one of the multiple blocks on which to perform a fold operation using the stored consolidated zones and groups of non-volatile memory cells associated with the zones and the current temperature information of the storage system.

6. The storage system of claim 1,
    wherein the control circuitry is configured to:
        prior to performing a first memory operation on a selective one of the multiple groups of non-volatile memory cells, determine one of the multiple groups of non-volatile memory cells on which to perform the first memory operation using the stored consolidated zones and groups of non-volatile memory cells associated with the zones.

7. The storage system of claim 1,
    wherein the control circuitry comprises a memory controller configured to:

receive a memory operation associated with a sub-group of the at least one of the multiple groups of non-volatile memory cells, and wherein the control circuitry is configured to:
  prior to reading data associated with the sub-group of the at least one of the multiple groups of non-volatile memory cells in response to the memory operation, determine a read parameter for the sub-group of the at least one of the multiple groups of non-volatile memory cells using the stored consolidated zone for the at least one of the multiple groups of non-volatile memory cells.

8. The storage system of claim 1,
wherein to store the consolidated zones and groups of non-volatile memory cells associated with the zones in volatile memory comprises in a dedicated first data structure on the storage system, and
wherein the control circuitry comprises a memory controller configured to:
  receive or detect an extended memory operation associated with a first sub-group of the at least one of the multiple groups of non-volatile memory cells, the extended memory operation including a fold operation or a sequential read operation, and wherein the control circuitry is configured to:
  prior to reading data associated with the extended memory operation, determine an initial read parameter using the determined variance of temperature information across the memory array; and
  load the stored consolidated zones and groups of non-volatile memory cells associated with the zones from the dedicated first data structure.

9. The storage system of claim 1, comprising:
a memory controller comprising a group of volatile memory cells, the memory controller configured to receive memory operations from a host device separate from the storage system; and
a memory device comprising a device controller and the first group of non-volatile memory cells,
wherein the control circuitry comprises a group of volatile memory cells and at least one of the memory controller or the device controller and is configured to store the consolidated zones and groups of non-volatile memory cells associated with the zones in a table in static memory.

10. The storage system of claim 1,
wherein, to receive temperature information corresponding to the write temperature of at least one page of memory cells, the control circuitry is configured to:
  receive temperature information corresponding to the write temperature of at least one page of non-volatile memory cells selected in response to a memory operation to determine group statistical measures of the temperature information for the first group of non-volatile memory cells; or
  receive temperature information corresponding to the write temperature of at least one page of non-volatile memory cells associated with a memory operation in which auxiliary data of the at least one page is read.

11. The storage system of claim 1,
wherein the control circuitry is configured to:
  update the determined group statistical measure of temperature information for a respective group of non-volatile memory cells, and store the updated determined group statistical measure, in response to receiving additional temperature information corresponding to a write temperature of at least one of multiple pages of the respective group of non-volatile memory cells.

12. A method, comprising:
receiving, using control circuitry of a storage system, temperature information corresponding to a write temperature of at least one of multiple pages of non-volatile memory cells of each of multiple groups of non-volatile memory cells of a memory array of the storage system;
determining, using the control circuitry, a group statistical measure of temperature information for each of the multiple groups of non-volatile memory cells using the received temperature information;
determining a variance of temperature information across the memory array;
consolidating the multiple groups of non-volatile memory cells into different zones associated with ranges of temperature information using the determined group statistical measures, the ranges dynamic with respect to the determined variance of temperature information across the memory array; and
storing, using the control circuitry, the consolidated zones and groups of non-volatile memory cells associated with the zones in volatile memory supporting the control circuitry to be available for use without a read operation of the non-volatile memory cells.

13. The method of claim 12, comprising:
receiving a read command for data associated with at least a portion of a first group of non-volatile memory cells;
prior to performing a read operation in response to the read command, determining a read parameter for the first group of non-volatile memory cells using the stored consolidated zone for the first group of non-volatile memory cells; and
reading data from the first group of non-volatile memory cells in response to the read command using the determined read parameter.

14. The method of claim 12,
wherein the pages of memory cells are organized into multiple blocks, the method further comprising:
  receiving current temperature information of the storage system; and
  determining one of the multiple blocks on which to perform a fold operation using the stored consolidated zones and groups of non-volatile memory cells associated with the zones and the current temperature information of the storage system.

15. The method of claim 12, comprising:
prior to performing a first memory operation on a selective one of the multiple groups of non-volatile memory cells, determining one of the multiple groups of non-volatile memory cells on which to perform the first memory operation using the stored consolidated zones and groups of non-volatile memory cells associated with the zones.

16. The method of claim 12, comprising:
receiving a memory operation associated with a sub-group of the at least one of the multiple groups of non-volatile memory cells; and
prior to reading data associated with the sub-group of the at least one of the multiple groups of non-volatile memory cells in response to the memory operation, determining a read parameter for the sub-group of the at least one of the multiple groups of non-volatile memory cells using the stored consolidated zone for the at least one of the multiple groups of non-volatile memory cells.

17. The method of claim 12,
wherein storing the consolidated zones and groups of non-volatile memory cells associated with the zones in volatile memory comprises in a dedicated first data structure on the storage system, and
wherein the method comprises:
receiving or detecting an extended memory operation associated with a first sub-group of the at least one of the multiple groups of non-volatile memory cells, the extended memory operation including a fold operation or a sequential read operation;
prior to reading data associated with the extended memory operation, determining an initial read parameter using the determined variance of temperature information across the memory array; and
loading the stored consolidated zones and groups of non-volatile memory cells associated with the zones from the dedicated first data structure.

18. The method of claim 12,
wherein receiving temperature information corresponding to the write temperature of the at least one of the multiple pages comprises:
receiving temperature information from at least one of the multiple pages of each of the multiple groups of non-volatile memory cells in response to a memory operation to determine group statistical measures of temperature information for the multiple groups of non-volatile memory cells; or
receiving temperature information from at least one of the multiple pages of each of the multiple groups of non-volatile memory cells in response to separate memory operations for each of the multiple groups.

19. The method of claim 12, comprising:
updating the determined group statistical measures of temperature information, and storing the updated determined group statistical measures, in response to receiving additional temperature information corresponding to a write temperature of at least one of the multiple pages of the multiple groups of non-volatile memory cells.

20. At least one non-transitory device-readable storage medium comprising instructions that, when executed by control circuitry of a storage system, cause the storage system to perform operations comprising:
receiving temperature information corresponding to a write temperature of at least one of multiple pages of non-volatile memory cells of each of multiple groups of non-volatile memory cells of a memory array of the storage system;
determining a group statistical measure of temperature information for each of the multiple groups of non-volatile memory cells using the received temperature information;
determining a variance of temperature information across the memory array;
consolidating the multiple groups of non-volatile memory cells into different zones associated with ranges of temperature information using the determined group statistical measures, the ranges dynamic with respect to the determined variance of temperature information across the memory array; and
storing the consolidated zones and groups of non-volatile memory cells associated with the zones in volatile memory supporting the control circuitry to be available for use without a read operation of the non-volatile memory cells.

21. The device-readable storage medium of claim 20, wherein the operations comprise:
determining, prior to performing a first memory operation on a selective one of the multiple groups of non-volatile memory cells, one of the multiple groups of non-volatile memory cells on which to perform the first memory operation using the stored consolidated zones and groups of non-volatile memory cells associated with the zones.

22. The device-readable storage medium of claim 20, wherein the operations comprise:
updating the determined group statistical measures of temperature information, and storing the updated determined group statistical measures, in response to receiving additional temperature information corresponding to a write temperature of at least one of the multiple pages of the multiple groups of non-volatile memory cells.

23. A method, comprising:
monitoring temperatures in multiple regions of non-volatile memory cells of a memory device during selected operations within such regions;
determining at least one region-level metric of monitored temperatures in the regions, the metric selected from the group consisting essentially of the maximum, minimum, mean, variance, standard deviation, coefficient of variation, and distribution of the monitored temperatures;
determining a variance of monitored temperatures across the multiple regions of non-volatile memory cells of the memory device;
consolidating the multiple regions of non-volatile memory cells into different zones associated with ranges of the at least one region-level metric of monitored temperatures using the at least one determined region-level metric, the ranges dynamic with respect to the determined variance of monitored temperatures across the multiple regions of non-volatile memory cells of the memory device; and
storing one or more bits representative of the consolidated zones and groups of non-volatile memory cells associated with the zones in volatile memory supporting the memory device to be available for use without a read operation of the non-volatile memory cells; and
reading the one or more stored bits representative of the consolidated zone for at least one monitored region to determine a region of the memory device in which a memory operation will be performed.

* * * * *